(12) United States Patent
Hagane

(10) Patent No.: US 7,805,145 B2
(45) Date of Patent: Sep. 28, 2010

(54) INFORMATION SEARCH SYSTEM USING RADIO PORTABLE TERMINAL

(75) Inventor: Hiroshi Hagane, Tokyo (JP)

(73) Assignee: NEC Corporation, Tokyo (JP)

( * ) Notice: Subject to any disclaimer, the term of this patent is extended or adjusted under 35 U.S.C. 154(b) by 700 days.

(21) Appl. No.: 09/771,880

(22) Filed: Jan. 30, 2001

(65) Prior Publication Data
US 2001/0023192 A1      Sep. 20, 2001

(30) Foreign Application Priority Data
Mar. 15, 2000    (JP) .............................. 2000-072964

(51) Int. Cl.
H04W 24/00 (2009.01)
(52) U.S. Cl. .................. 455/456.1; 455/456.2; 455/563
(58) Field of Classification Search ................. 455/563, 455/414.1, 414.3, 414.4, 426.1, 456.1, 456.2; 370/338, 352, 354, 328; 379/93.17, 88.17, 379/93.01, 93.07; 709/203, 217, 218, 219
See application file for complete search history.

(56) References Cited

U.S. PATENT DOCUMENTS

| 5,884,262 | A | * | 3/1999 | Wise et al. ............... 704/270.1 |
| 6,108,630 | A | * | 8/2000 | Kuechler et al. ............ 704/270 |
| 6,317,684 | B1 | * | 11/2001 | Roeseler et al. ............ 701/202 |
| 2002/0168986 | A1 | * | 11/2002 | Lau et al. .................... 455/456 |
| 2003/0078766 | A1 | * | 4/2003 | Appelt et al. .................. 704/9 |

FOREIGN PATENT DOCUMENTS

| EP | 0 859 500 A2 | | 8/1998 |
| EP | 859500 | * | 8/1998 |
| JP | 08-285086 | * | 5/1998 |
| JP | 10-124291 A | | 5/1998 |
| JP | 10-126852 A | | 5/1998 |
| JP | 10-133847 A | | 5/1998 |
| JP | 10-177268 A | | 6/1998 |
| JP | 10-177469 A | | 6/1998 |
| WO | WO 98/35491 A1 | | 8/1998 |

OTHER PUBLICATIONS

Patent Abstracts of Japan, vol. 1998, No. 10, Aug. 31, 1998 corresponding to JP-A-10-133847.

* cited by examiner

*Primary Examiner*—Nay A Maung
*Assistant Examiner*—Richard Chan
(74) *Attorney, Agent, or Firm*—Sughrue Mion, PLLC

(57) ABSTRACT

Information search system includes terminal having speech communication function and packet communication function and center for selectively performing speech communication and packet communication with the terminal. Center includes speech control section, speech recognition section, information search section, speech conversion section, and packet control section. Speech control section performs speech communication with the terminal packet communication. Speech recognition section recognizes speech signal received by speech control section and sent from the terminal. Information search section searches for information on the basis of speech information recognized by speech recognition section. Speech conversion section converts speech information of the information searched out by information search section into speech signal and outputs it to speech control section. Speech signal from speech conversion section is transmitted to the terminal by speech control section. Packet control section transmits image/character information of the information searched by information search section to the terminal by packet communication.

30 Claims, 4 Drawing Sheets

| SELF-STATION IP ADDRESS | SELF-STATION SPEECH COMMUNICATION ADDRESS |
|---|---|
| 0001 | 070-555-8888 |
| 0002 | 070-666-9999 |
| 0003 | 070-333-2222 |
| ⋮ | ⋮ |

24

F I G. 3

000
INFORMATION SEARCH SYSTEM USING RADIO PORTABLE TERMINAL

BACKGROUND OF THE INVENTION

The present invention relates to a radio portable communication system and, more particularly, to an information search system for searching for information by using packet communication over a radio portable terminal.

In an information search system using packet communication over portable telephones, an operator selects a search word from search items displayed on the screen of a portable telephone or inputs a search word as characters by operating keys on the portable telephone and transmits the search word in a packet to an information provider. The information provider searches for information on the basis of the received search word, and then returns the found information to the portable telephone upon packeting it. The found information is displayed on the screen of the portable telephone.

As a system capable of easily searching for information, other than the above system using packet communication, an information search system using speech communication over portable telephones is available. In this information search system using speech communication, an uttered search word is speech-recognized and information is searched out by the information provider on the basis of the recognized search word. Thereafter, the found information is converted into speech and returned to the portable telephone.

In the information search system using packet communication, however, when many search words are prepared, they cannot be displayed on the window of the portable telephone at once. For this reason, search items must be arranged in a tree structure and a search word must be selected while pictures on the screen are switched. However, it takes time to reach the target search word.

As another method of inputting a search word, a method of inputting a search word as characters by operating key buttons on a portable telephone is available. However, the keys on the portable telephone are small in size. In addition, since a plurality of characters are assigned to one key, cumbersome operation is required, and much time is required for the operation.

In the above information search system using speech communication, a search word can be easily input by speech over a portable telephone. However, a search result is returned by speech and is not recorded. In addition, image information cannot be returned to the portable telephone.

SUMMARY OF THE INVENTION

It is an object of the present invention to provide an information search system designed to improve the operability of a radio portable telephone in inputting an information search word/data.

It is another object of the present invention to provide an information search system which can recognize a search result in speech, image, and character.

In order to achieve the above objects, according to the present invention, there is provided an information search system comprising a terminal having a speech communication function and packet communication function, and a center for selectively performing speech communication and packet communication with the terminal, the center including speech control means for performing speech communication with the terminal during execution of packet communication by the terminal, speech recognition means for recognizing a speech signal received by the speech control means and sent from the terminal, information search means for searching for information on the basis of the speech information recognized by the speech recognition means, speech conversion means for converting the speech information of the information searched out by the information search means into a speech signal and outputting the signal to the speech control means, the speech signal from the speech conversion means being transmitted to the terminal by the speech control means, and packet control means for transmitting image/character information of the information searched by the information search means to the terminal by packet communication.

BRIEF DESCRIPTION OF THE DRAWINGS

FIG. 3 is a view showing the correspondence between the self-station IP address of each radio portable terminal and a corresponding self-station speech communication address.

DESCRIPTION OF THE PREFERRED EMBODIMENT

The present invention will be described in detail below with reference to the accompanying drawings.

Figure 1:
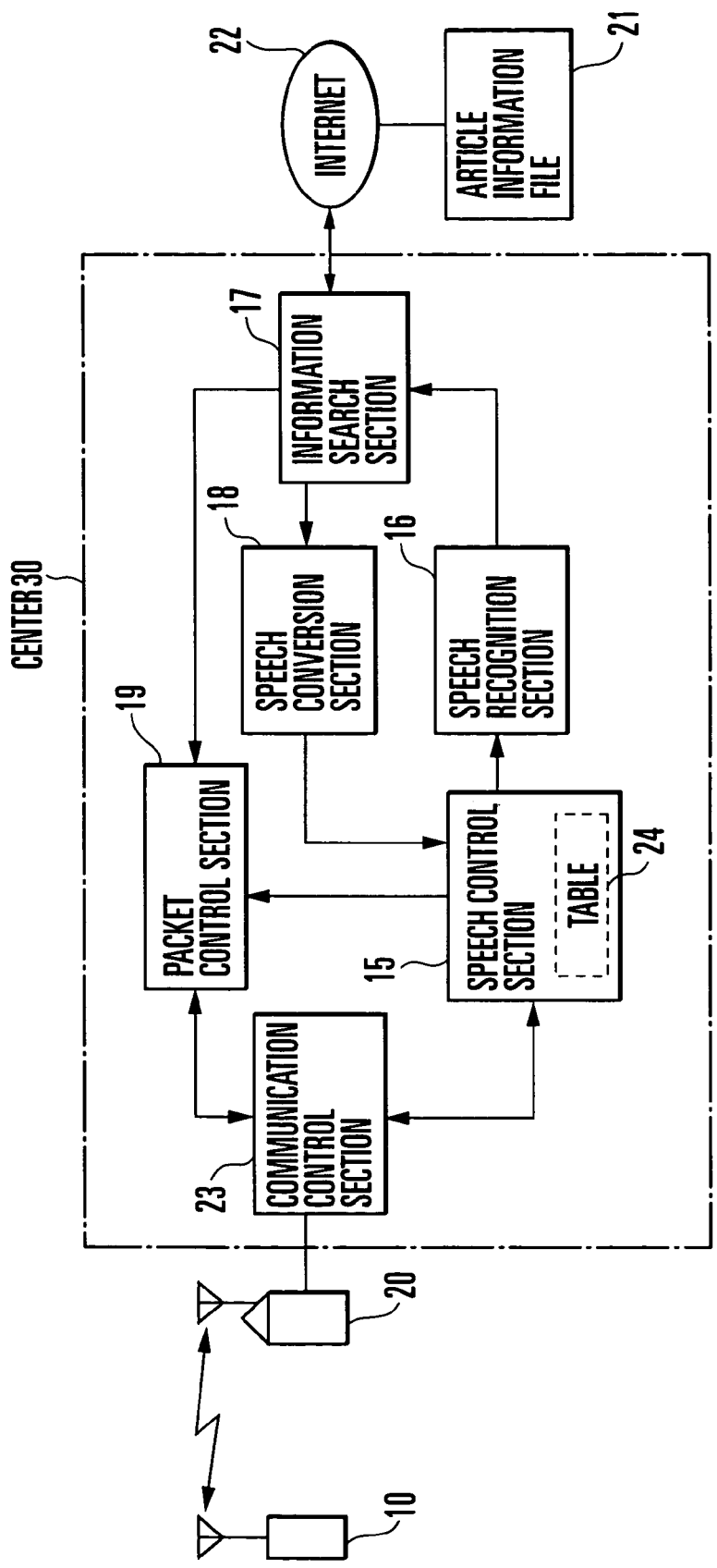
FIG. 1 is a block diagram showing an information search system according to an embodiment of the present invention.

FIG. 1 shows an information search system according to an embodiment of the present invention. The information search system of this embodiment is applied to a radio portable terminal communication system. The information search system shown in FIG. 1 is comprised of a radio portable terminal 10 having a speech communication function and packet communication function, a base station 20 for performing radio communication with the radio portable terminal 10, a center 30 to which the base station 20 is connected, the Internet 22 to which the center 30 is connected, and an article information file 21 connected to the Internet 22.

The center 30 is comprised of a speech control section 15 for controlling speech communication with the radio portable terminal 10 via the base station 20, a speech recognition section 16 for recognizing the speech received by the speech control section 15, an information search section 17 for searching for information in accordance with the recognition result obtained by the speech recognition section 16, a speech conversion section 18 for converting the search result (speech information) obtained by the information search section 17 into speech and outputting it to the speech control section 15, a packet control section 19 for controlling packet communication with the radio portable terminal 10 via the base station 20, and a communication control section 23 for switching between speech communication by the speech control section 15 and packet communication by the packet control section 19.

The speech control section 15 includes a table 24 storing the correspondence between the self-station IP (Internet Protocol) address of each portable terminal and a corresponding self-station speech communication address. The information search system of this embodiment has a calling number identification notifying function of automatically notifying a callee of the calling number of a caller. This calling number identification notifying function is a known function in the telephone communication field including radio portable terminal communication systems.

Figure 2A:
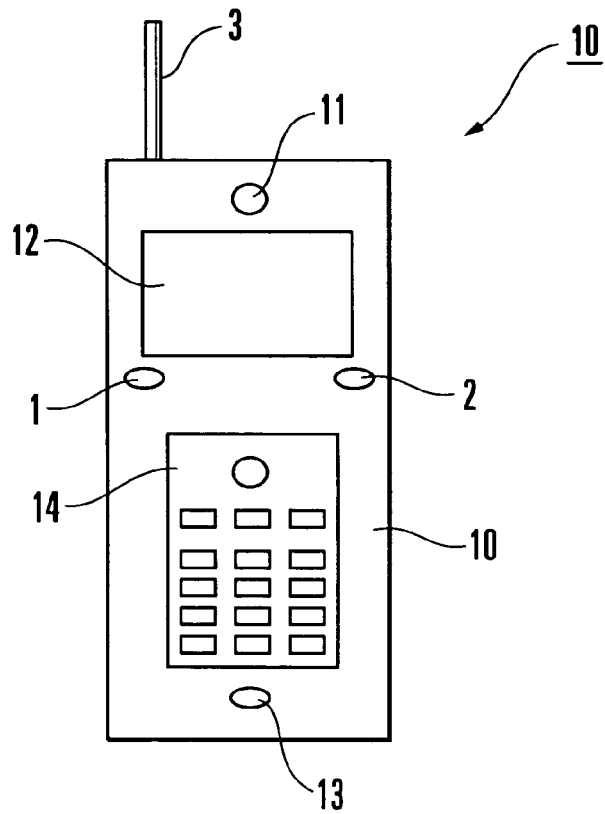
FIG. 2A is a front view of a radio portable terminal in FIG. 1.

As shown in FIG. 2A, the radio portable terminal 10 has, on its panel surface, a packet communication→speech communication switch (to be referred to as a switch hereinafter) 1, a speech communication→packet communication switch (to be referred to as a switch hereinafter) 2, a microphone 13 to which speech is input, a speaker 11 for outputting a speech signal, a display screen 12 on which image/character information is displayed, and a key operation section 14 on which dial input operation or the like is performed.

Figure 2B:
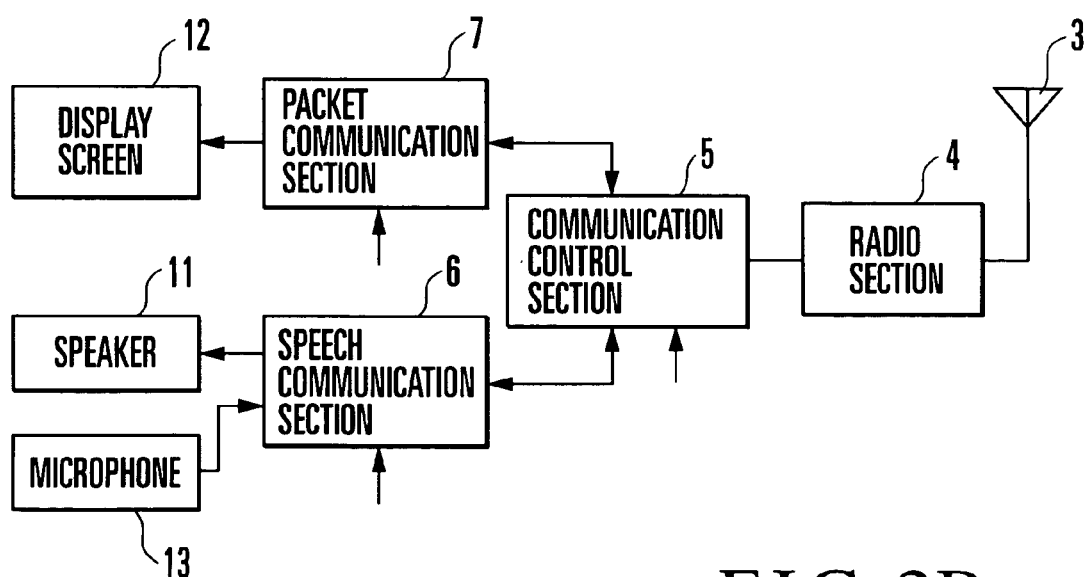
FIG. 2B is a block diagram showing the main part of the radio portable terminal.

As shown in FIG. 2B, the radio portable terminal 10 includes a radio section 4 for performing radio communication with the base station 20 via an antenna 3, a communication control section 5 which is connected to the radio section 4 to switch between speech communication and packet communication, a speech communication section 6 for performing speech communication with the center 30 via the radio section 4 and base station 20, and a packet communication section 7 for performing packet communication with the center 30 via the communication control section 5, radio section 4, and base station 20. The speaker 11 and microphone 13 are connected to the speech communication section 6. The display screen 12 is connected to the packet communication section 7. The communication control section 5, speech communication section 6, and packet communication section 7 perform communication switching and communication control in accordance with outputs from the switches 1 and 2 and the key operation section 14.

FIG. 3 shows an example of the data stored in the table 24. The table 24 is created by the following method. A user key-inputs the self-station speech communication address of the radio portable terminal 10 and transmits it to the center by packet communication. The center then obtains the relationship between the self-station IP address of the packet communication and the transmitted self-station speech communication address. The obtained relationship is stored in the table 24 in advance as the relationship between the self-station IP address of the radio portable terminal 10 and the self-station speech communication address.

Figure 4:
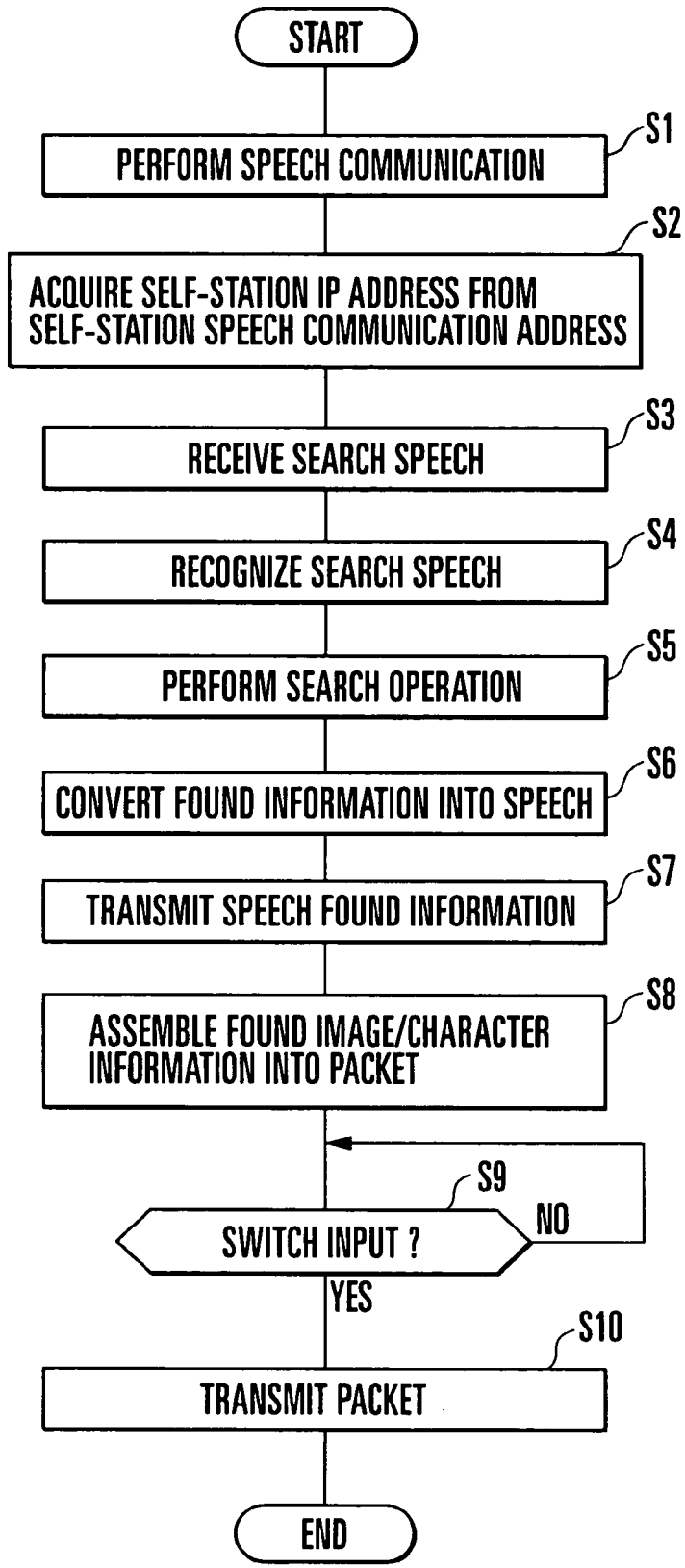
FIG. 4 is a flow chart showing search operation performed by the information search system in FIG. 1.

Search operation in the above information search system will be described next with reference to the flow chart of FIG. 4. Assume that the message "Please input a trade name" is displayed on the display screen 12 of the radio portable terminal 10 during packet communication to prompt the user to input a trade name, and the user searches an article information file on the Internet for information by speech-inputting information about the trade name "ABC" as a search keyword.

The user presses the switch 1 of the radio portable terminal 10 during packet communication between the packet communication section 7 of the radio portable terminal 10 and the packet control section 19 of the center 30, and then dials through the key operation section 14 to start speech communication with the center 30 via the base station 20 (step S1). At this time, communication paths are switched by the communication control sections 5 and 23, and speech communication is performed between the speech communication section 6 of the radio portable terminal 10 and the speech control section 15 of the center 30. At the same time when a speech communication path is established, the speech control section 15 of the center 30 looks up the center 30 to acquire a corresponding self-station IP address in accordance with the self-station speech communication address of the radio portable terminal 10 notified by the calling number identification presentation function (step S2). The acquired self-station IP address is sent to the packet control section 19 and held therein.

When the user utters the trade name "ABC" toward the microphone 13, the speech input to the microphone 13 is received by the speech control section 15 of the center 30 via the speech communication path and output to the speech recognition section 16 (step S3). The speech recognition section 16 recognizes the speech output from the speech control section 15 (step S4) and outputs the recognition result "ABC" to the information search section 17. The information search section 17 performs a keyword search in accordance with the recognition result obtained by the speech recognition section 16 to acquire found information about the trade name "ABC" from the article information file 21 on the Internet (step S5).

The information search section 17 sends, to the speech conversion section 18, information of the found information about the trade name "ABC" which can be provided to the user by speech. The speech conversion section 18 converts the information from the information search section 17 into speech and sends it to the speech control section 15 (step S6). The speech control section 15 transmits the speech information about the trade name "ABC" to the radio portable terminal 10 via the speech communication path (step S7). The radio portable terminal 10 receives the speech information about the trade name "ABC" from the center 30 through the speech communication section 6 and outputs it from the speaker 11.

The information search section 17 sends image/character information or the like which is associated with the trade name "ABC" and can be displayed on the screen to the packet control section 19. The packet control section 19 assembles the image/character information from the information search section 17 into a packet (step S8). When the user presses the switch 2 of the radio portable terminal 10 (step S9: YES), the packet control section 19 transmits the packet of the image/character information to the held IP address of the radio portable terminal 10 via a packet communication path (step S10). The radio portable terminal 10 receives the image/character information from the center 30 through the packet communication section 7 and displays it on the display screen 12.

In the embodiment described above, the user manually operates the switches 1 and 2 to switch packet communication and speech communication. However, the packet control section 19 or speech control section 15 may automatically switch them in accordance with an instruction from a program.

Alternatively, the center 30 may designate, by packet communication, the speech communication address of the center which is to be dialed for speech communication with respect to the radio portable terminal 10 during execution of packet communication by the radio portable terminal 10. In this case, the calling radio portable terminal 10 can be specified from a terminated speech communication address, and the IP address of the radio portable terminal 10 can be acquired.

If a broadband communication network is used as an infrastructure, the present invention can be implemented even in a condition where packet communication and speech communication are concurrently started and continued without switching them in the process of communication. In this case, the positions and presence/absence of switches impose no limitations on the present invention.

As has been described above, according to the present invention, when the user needs to input data during packet communication using a portable terminal, search images/characters are displayed on the display screen of the portable terminal by uttering a search keyword toward the microphone of the portable terminal. This makes it possible to easily input information search words or data with many items by speech during packet communication, thus improving the operability of the portable terminal. In addition, the search images/characters can be visually checked to improve the performance of the portable terminal.

What is claimed is:

1. An information search system comprising:
   a terminal having a speech communication function, a packet communication function, and an information search function that uses a packet communication;
   a center for selectively performing speech communication and packet communication with said terminal,
   said center comprising:
      speech control means for performing speech communication with said terminal using the speech communication function, while the terminal is performing an information search using the information search function using a packet communication;
      speech recognition means for recognizing a speech signal received by said speech control means and sent from said terminal;
      information search means for searching for information on the basis of the speech information recognized by said speech recognition means;
      speech conversion means for converting the speech information of the information searched out by said information search means into a speech signal and outputting the signal to said speech control means, the speech signal from said speech conversion means being transmitted to said terminal by said speech control means; and
      packet control means for transmitting at least one of image information and character information of the information searched out by said information search means to said terminal by packet communication.

2. A system according to claim 1, wherein said information search means searches for information through the Internet.

3. A system according to claim 1, wherein said system further comprises a table indicating a relationship between a self-station packet communication address of said terminal and a self-station speech communication address, and
   said speech control means looks up said table when speech communication is started, and notifies said packet control means of a self-station packet communication address corresponding to the self-station speech communication address of said terminal which is notified by the calling number identification notifying function.

4. A system according to claim 3, wherein the self-station speech communication address is transmitted from said terminal to said center by packet communication, and the relationship between the self-station packet communication address of the packet communication and the self-station speech communication address transmitted from said terminal is registered in said table.

5. A system according to claim 1, wherein a speech communication address of said center is designated by said center with respect to said terminal during execution of packet communication by said terminal, and
   a packet communication address of said terminal which has performed speech communication with said center is acquired by specifying said terminal from the terminated speech communication address.

6. A system according to claim 1, wherein said center further comprises communication control means for switching speech communication by said speech control means and packet communication by said packet communication means.

7. A system according to claim 6, wherein said terminal comprises switch means for alternately switching speech communication and packet communication, and
   said communication control means performs switching operation in accordance with an output from said switch means.

8. A system according to claim 6, wherein said communication control means automatically performs switching operation under sequence control.

9. A system according to claim 1, wherein said terminal comprises
   a microphone to which speech transmitted to said center is input,
   a speaker for outputting a speech signal transmitted from said center,
   a display screen on which image/character information transmitted from said center is displayed, and
   a key operation section for performing dial-input operation.

10. A system according to claim 1, wherein said terminal comprises
    radio means for performing radio communication with a base station to which said center is connected,
    speech communication means for performing speech communication with said center,
    packet communication means for performing packet communication with said center, and
    communication control means for switching speech communication by said speech communication means and packet communication by said packet communication means.

11. The terminal of the information search system according to claim 1 for searching for information by selectively performing speech communication, packet communication and information searching using the packet communication, with the center, comprising:
    a microphone to which speech transmitted to the center by speech communication is input;
    a speaker for outputting a speech signal transmitted from the center by speech communication;
    a display screen on which at least one of image information and character information transmitted from the center by packet communication is displayed;
    a key operation section for performing dial-input operation;
    radio means for performing radio communication with a base station to which the center is connected;
    speech communication means for inputting and outputting a speech signal between said speaker and said microphone by performing speech communication with said center;
    packet communication means for outputting at least one of image information and character information to said display screen by performing packet communication with the center; and
    communication control means for performing speech communication during execution of packet communication for an information search with the center by switching speech communication by said speech communication means and packet communication by said packet communication means;
    and wherein said communication control means for performing speech communication during execution of packet communication with the center.

12. A center of an information search system for searching for information by selectively performing speech communication, packet communication and information searching, with a terminal, comprising:
- speech control means for performing speech communication with the terminal using a speech communication function,
- speech recognition means for recognizing a speech signal received by said speech control means and sent from the terminal;
- information search means for searching for information based on a packet communication and the speech information recognized by said speech recognition means;
- speech conversion means for converting the information searched out by said information search means into a speech signal and outputting the signal to said speech control means, the speech signal from said speech conversion means being transmitted to the terminal by said speech control means; and
- packet control means for transmitting at least one of image information and character information of the information searched out by said information search means to the terminal by packet communication.

13. A center according to claim 12, wherein said system further comprises a table indicating a relationship between a self-station packet communication address of the terminal and a self-station speech communication address, and
- said speech control means looks up said table when speech communication is started, and notifies said packet control means of a self-station packet communication address corresponding to the self-station speech communication address of the terminal which is notified by the calling number identification notifying function.

14. A center according to claim 13, wherein the self-station speech communication address is transmitted from the terminal to said center by packet communication, and the relationship between the self-station packet communication address of the packet communication and the self-station speech communication address transmitted from the terminal is registered in said table.

15. A system according to claim 12, wherein a speech communication address of said center is designated by said center with respect to the terminal during execution of packet communication by the terminal, and
- a packet communication address of the terminal which has performed speech communication with said center is acquired by specifying the terminal from the terminated speech communication address.

16. A center according to claim 12, further comprising communication control means for switching speech communication by said speech control means and packet communication by said packet communication means in accordance with switching operation of the terminal.

17. A center of an information search system for searching for information by performing speech communication, packet communication and information searching with a terminal, comprising:
- speech control means for performing speech communication with the terminal using a speech communication function, while the terminal is performing an information search using the information search system using a packet communication;
- speech recognition means for recognizing a speech signal received by said speech control means and sent from the terminal,
- information searching means for searching for information based on a packet communication and speech information recognized by said speech recognition means;
- packet control means for transmitting at least one of image information and character information of the information searched out by said information means to said terminal by packet communication; and
- speech conversion means for converting speech information of the information searched out by said information search means into a speech signal and outputting the signal to said speech control means, the speech signal from said speech conversion means being transmitted to said terminal by said speech control means.

18. A system according to claim 1, wherein said speech control means start a speech communication function and transmits search information by a speech, while a terminal is performing an information search using an information search function using a packet communication.

19. A portable terminal according to claim 1, for performing speech communication and text communication with the center, comprising:
- sending means for sending a speech signal to the center by said speech communication, during execution of an information search using said text communication with the center, and
- receiving means for receiving information based on said speech signal from the center by said text communication.

20. A portable terminal according to claim 19, wherein said text communication is performed by packet communication.

21. A portable terminal according to claim 19, further comprises displaying means for displaying said information received by said receiving means.

22. A method for performing speech communication and text communication in a system comprising a center and a portable terminal, the method comprising:
- sending a speech signal from the portable terminal to the center by speech communication while the portable terminal is executing an information search using the text communication with the center;
- receiving, by the center, the speech signal;
- the center:
  - performing speech communication with said portable terminal using the speech communication function, while the portable terminal is performing an information search using the information search function using a packet communication;
  - recognizing a speech signal received by said speech control means and sent from said portable terminal;
  - searching for information on the basis of the speech information recognized by said speech recognition means;
  - converting the speech information of the information searched out by said information search means into a speech signal and outputting the signal to said speech control means, the speech signal from said speech conversion means being transmitted to said portable terminal by said speech control means; and
  - transmitting at least one of image information and character information of the information searched out by said information search means to said portable terminal by text communication.

23. A method according to claim 22, wherein the text communication is performed by packet communication.

24. A method according to claim 22, wherein the information searching is performed during execution of the text communication.

25. A method according to claim 22, further comprising receiving the search information by the portable terminal by the text communication.

26. A method according to claim 22, further comprising displaying the searched information received by the portable terminal.

27. A method for operating a center to perform speech communication and text communication with a portable terminal, comprising :
 receiving a speech signal from the portable terminal by speech communication;
 performing speech communication with said portable terminal using the speech communication function, while the portable terminal is performing an information search using the information search function using a packet communication;
 recognizing a speech signal received by said speech control means and sent from said portable terminal;
 searching for information on the basis of the speech information recognized by said speech recognition means, while the portable terminal is executing an information search using the text communication with the center;
 converting the speech information of the information searched out by said information search means into a speech signal and outputting the signal to said speech control means, the speech signal from said speech conversion means being transmitted to said portable terminal by said speech control means; and
 transmitting at least one of image information and character information of the information searched out by said information search means to said portable terminal by text communication.

28. A method according to claim 27, wherein the text communication is performed by packet communication.

29. A method for operating a portable terminal to performing speech communication and text communication with a center, comprising:
 sending a speech signal to the center by speech communication, during execution of an information search using the text communication with the center, and
 receiving information based on the speech signal from the center by text communication, wherein the center:
 performing speech communication with said portable terminal using the speech communication function, while the portable terminal is performing an information search using the information search function using a packet communication;
 recognizing a speech signal received by said speech control means and sent from said portable terminal;
 searching for information on the basis of the speech information recognized by said speech recognition means, while the portable terminal is executing an information search using the text communication with the center;
 converting the speech information of the information searched out by said information search means into a speech signal and outputting the signal to said speech control means, the speech signal from said speech conversion means being transmitted to said portable terminal by said speech control means; and
 transmitting at least one of image information and character information of the information searched out by said information search means to said portable terminal by text communication.

30. A method according to claim 29, wherein the text communication is performed by packet communication.

* * * * *